US012717505B2

(12) United States Patent
Sun et al.

(10) Patent No.: US 12,717,505 B2
(45) Date of Patent: Aug. 25, 2026

(54) STORAGE MEDIA DEPLOYMENT MODE BASED BIG DATA DISTRIBUTED PROCESSING METHOD, DEVICE, AND SYSTEM

(71) Applicant: HUAWEI TECHNOLOGIES CO., LTD., Shenzhen (CN)

(72) Inventors: Hongwei Sun, Beijing (CN); Guangcheng Li, Beijing (CN); Huawei Liu, Dongguan (CN); Xiaoming Bao, Beijing (CN); Jun You, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/642,335

(22) Filed: Apr. 22, 2024

(65) Prior Publication Data

US 2024/0272818 A1 Aug. 15, 2024

Related U.S. Application Data

(63) Continuation of application No. PCT/CN2022/125921, filed on Oct. 18, 2022.

(30) Foreign Application Priority Data

Oct. 22, 2021 (CN) ......................... 202111234307.4
Dec. 22, 2021 (CN) ......................... 202111583902.9

(51) Int. Cl.
*G06F 3/06* (2006.01)

(52) U.S. Cl.
CPC .......... *G06F 3/0634* (2013.01); *G06F 3/0604* (2013.01); *G06F 3/067* (2013.01)

(58) Field of Classification Search
CPC ....... G06F 3/0634; G06F 3/0604; G06F 3/067
See application file for complete search history.

(56) References Cited

U.S. PATENT DOCUMENTS

2013/0219068 A1* 8/2013 Ballani ................ G06Q 10/063 709/226
2013/0318525 A1* 11/2013 Palanisamy ........... G06F 9/5066 718/1

(Continued)

FOREIGN PATENT DOCUMENTS

CN 105138679 A 12/2015
CN 111435943 A 7/2020

*Primary Examiner* — Mark A Giardino, Jr.

(57) ABSTRACT

A control device is provided to control a computing device to perform big data distributed processing. The computing device is equipped with storage media in a plurality of deployment modes. The storage media include at least two of a local storage medium in the computing device, a global storage medium formed based on the local storage medium, an extended global storage medium, and an extended local storage medium. The control device obtains a service request for a big data service, determines storage media in at least one deployment mode from the storage media in the plurality of deployment modes, sends a control indication to the computing device, to indicate the computing device to execute a map task in big data distributed processing on service data included in the service request, and stores obtained intermediate data in the storage media in the at least one deployment mode.

20 Claims, 9 Drawing Sheets

(56) References Cited

U.S. PATENT DOCUMENTS

2015/0128150 A1* 5/2015 Ueda .................... G06F 9/5088
718/105
2016/0335134 A1 11/2016 Gupta et al.
2018/0307425 A1* 10/2018 Blount .................. G06F 3/0631
2021/0081878 A1* 3/2021 Brunn ................ G06Q 10/1095
2024/0020279 A1* 1/2024 Kumar ................ G06F 11/3452

* cited by examiner

STORAGE MEDIA DEPLOYMENT MODE BASED BIG DATA DISTRIBUTED PROCESSING METHOD, DEVICE, AND SYSTEM

CROSS-REFERENCE TO RELATED APPLICATIONS

This application is a continuation of International Application No. PCT/CN2022/125921, filed on Oct. 18, 2022, which claims priority to Chinese Patent Application No. 202111583902.9, filed on Dec. 22, 2021, which claims priority to Chinese Patent Application No. 202111234307.4, filed on Oct. 22, 2021, all of which are hereby incorporated by reference in their entireties.

TECHNICAL FIELD

Embodiments of this application relate to the field of big data, and in particular, to a data processing method and apparatus, a device, and a system.

BACKGROUND

Big data is a massive, high-growth, and diversified information asset that requires innovative processing modes to provide stronger decision-making, insight, and process optimization capabilities. Generally, a plurality of computing devices perform distributed processing on big data based on a MapReduce model. Because data is distributed in different computing devices, a computing device that executes a map task stores intermediate data obtained after the map task. A computing device that executes a reduce task may read the intermediate data from a remote end. This data exchange process is referred to as shuffle. Currently, a computing device stores intermediate data in a memory or a hard disk in the computing device. In a scenario in which distributed processing is performed on big data based on a MapReduce model, storage space of a storage medium in a computing device is excessively occupied.

SUMMARY

Embodiments of this application provide a data processing method and apparatus, a device, and a system, to reduce occupied storage space of a storage medium in a computing device.

According to a first aspect, a data processing method is provided. The method is performed by a control device. The control device is configured to control a computing device to perform big data distributed processing, the computing device is equipped with storage media in a plurality of deployment modes, and the storage media in the plurality of deployment modes include at least two of a local storage medium in the computing device, a global storage medium formed based on the local storage medium, an extended global storage medium, and an extended local storage medium. The method includes: The control device obtains a service request for a big data service, determines storage media in at least one deployment mode from the storage media in the plurality of deployment modes, sends a control indication to the computing device, to indicate the computing device to execute a map task in the big data distributed processing on service data included in the service request, and stores obtained intermediate data in the storage media in the at least one deployment mode.

In this way, the control device may select, from storage media in a plurality of deployment modes, a storage medium for storing intermediate data, to reduce occupied storage space of a storage medium (for example, a memory or a disk) in the computing device for storing the intermediate data, and release more available storage space for the computing device to execute the map task or a reduce task, thereby improving processing efficiency of the computing device in processing the map task or the reduce task.

In a possible implementation, the determining storage media in at least one deployment mode from the storage media in the plurality of deployment modes includes: The control device determines the storage media in the at least one deployment mode from the storage media in the plurality of deployment modes based on a storage policy. The storage policy indicates a method for selecting a storage medium based on a storage medium feature. The storage medium feature includes at least one of a write delay, a read delay, a total storage capacity, an available storage capacity, an access speed, central processing unit (CPU) consumption, an energy consumption ratio, and reliability.

Example 1: The determining the storage media in the at least one deployment mode from the storage media in the plurality of deployment modes based on a storage policy includes: The control device determines the storage media in the at least one deployment mode from the storage media in the plurality of deployment modes based on priorities of the storage media in the plurality of deployment modes indicated by the storage policy, where the priorities of the storage media in the plurality of deployment modes are determined based on the storage medium feature.

Example 2: The determining the storage media in the at least one deployment mode from the storage media in the plurality of deployment modes based on a storage policy includes: The control device determines, based on a user requirement and storage medium features of the storage media in the plurality of deployment modes, the storage media in the at least one deployment mode that meets the user requirement from the storage media in the plurality of deployment modes, where the user requirement indicates a requirement related to the storage medium feature. In this way, when selecting the storage medium for storing the intermediate data from the storage media in the plurality of deployment modes, the control device dynamically selects, based on the user requirement of a user for a feature such as the access speed or the reliability, the storage medium that meets the user requirement of the at least one deployment mode. Compared with a storage medium in one deployment mode for storing intermediate data of different scenarios, a scenario requirement of data processing performance (for example, a data processing rate) and reliability is ensured.

The storage medium includes a memory, a hard disk, a memory server, and a storage-class memory (SCM). In this way, the memory server and the SCM are introduced into a big data distributed processing system, and the storage medium for storing the intermediate data is extended, so that the storage medium for storing the intermediate data has more possibilities, and occupied storage space of the storage medium in the computing device for storing the intermediate data is reduced, thereby improving reliability of the intermediate data.

It should be noted that the storage policy is configured at a big data service granularity, or configured at a task granularity in the big data service, or configured at a system global granularity.

In another possible implementation, after the sending a control indication to the computing device, the method further includes: The control device receives a storage location of the intermediate data in the storage media in the at least one deployment mode sent by the computing device, where the storage location of the intermediate data is for reading the intermediate data when the reduce task is executed. Further, the control device receives the intermediate data request sent by the computing device, where the intermediate data request is used for the storage location of the intermediate data. The control device sends, to the computing device, metadata that indicates the storage location of the intermediate data, where the metadata indicates the storage location of the intermediate data. The computing device obtains the intermediate data based on the metadata.

According to a second aspect, a data processing method is provided, where the method is performed by a computing device, the computing device is equipped with storage media in a plurality of deployment modes, the computing device is connected to a control device, and the control device is configured to control the computing device to perform big data distributed processing. The method includes: The computing device executes a map task in the big data distributed processing on service data based on a control indication sent by the control device, to obtain intermediate data; and stores the intermediate data in storage media indicated by identifiers of storage media in at least one deployment mode. The control indication includes service data and the identifiers of the storage media in the at least one deployment mode. The storage media in the at least one deployment mode are determined by the control device from storage media in a plurality of deployment modes based on a storage policy. The storage policy indicates a method for selecting a storage medium based on a storage medium feature.

In this way, the storage media in the plurality of deployment modes are added to a system, so that the control device can select a storage medium for storing intermediate data from the storage media in the plurality of deployment modes, and the computing device stores, based on an indication of the control device, the intermediate data in storage media indicated by the identifiers of the storage media in the at least one deployment mode, to reduce occupied storage space of a storage medium (for example, a memory or a disk) in the computing device that is for storing the intermediate data, and release more available storage space for the computing device to execute the map task or a reduce task. This improves processing efficiency of processing the map task or the reduce task by the computing device.

In a possible implementation, the storing the intermediate data in storage media indicated by the identifiers of the storage media in the at least one deployment mode includes: if the storage media in the at least one deployment mode includes a plurality of storage media in one deployment mode, respectively storing a plurality of shards of the intermediate data in the plurality of storage media; or if the storage media in the at least one deployment mode includes storage media in more than two deployment modes, respectively storing a plurality of shards of the intermediate data in the storage media in the more than two deployment modes.

In another possible implementation, the storage media in the plurality of deployment modes include a first storage medium and a second storage medium, and the method further includes: if an available storage capacity of the first storage medium is less than a threshold, storing data of the first storage medium into the second storage medium, where an access speed of the first storage medium is higher than an access speed of the second storage medium. Therefore, after the intermediate data in the storage medium whose available storage capacity is less than the threshold is removed, an available storage capacity of the storage medium can be increased, so as to improve processing efficiency of the intermediate data, and ensure that the intermediate data can be normally written into the storage medium.

In another possible implementation, the method further includes: The computing device sends available storage capacities of the storage media in the plurality of deployment modes to the control device, so that the control device determines the storage media in the at least one deployment mode from the storage media in the plurality of deployment modes based on the available storage capacities of the storage media.

According to a third aspect, a control apparatus is provided. The apparatus includes modules configured to perform the data processing method in the first aspect or any possible design of the first aspect.

According to a fourth aspect, a data processing apparatus is provided. The apparatus includes modules configured to perform the data processing method in the second aspect or any possible design of the second aspect.

According to a fifth aspect, a control device is provided. The control device includes at least one processor and a memory, and the memory is configured to store a set of computer instructions. When the processor is used as an execution device in the first aspect or any possible implementation of the first aspect to execute the group of computer instructions, the processor performs the operation steps of the data processing method in the first aspect or any possible implementation of the first aspect.

According to a sixth aspect, a computing device is provided. The computing device includes at least one processor and a memory, and the memory is configured to store a set of computer instructions. When the processor is used as an execution device in the second aspect or any possible implementation of the second aspect to execute the group of computer instructions, the processor performs the operation steps of the data processing method in the second aspect or any possible implementation of the second aspect.

According to a seventh aspect, a computer-readable storage medium is provided, including computer software instructions. When the computer software instructions are run on a computing device, the computing device is enabled to perform the operation steps of the method according to the first aspect or any possible implementation of the first aspect, or perform the operation steps of the method according to the second aspect or any possible implementation of the second aspect.

According to an eighth aspect, a computer program product is provided. When the computer program product is run on a computer, the computing device is enabled to perform the operation steps of the method according to the first aspect or any possible implementation of the first aspect, or perform the operation steps of the method according to the second aspect or any possible implementation of the second aspect.

Based on the implementations provided in the foregoing aspects, this application may further be combined to provide more implementations.

DESCRIPTION OF EMBODIMENTS

With the development of services such as the Internet, Internet of Things, network bandwidth, intelligent terminals, and cloud computing, data types and data scale are developing at an unprecedentedly speed. Big data is emerging, and data is transformed from a single processing object to a basic resource. Big data is a collection of data that cannot be captured, managed, and processed using conventional software tools within a period of time.

Sources of big data may include management systems, web systems, physical systems, and scientific experiment systems. The management system includes a transaction processing system and an office automation system. The web system includes an Internet system, such as a search engine. The physical system refers to a system about physical objects and physical processes, such as real-time monitoring, real-time detection, or production scheduling. The scientific experiment system refers to a physical system based on an experimental environment.

Big data is classified based on data structure features. Big data includes structured data, unstructured data, and semi-structured data. The structured data is data represented in a unified structure, such as data stored in a database of a financial system, enterprise resource planning system, or customer relationship management system. The unstructured data is data whose field length is variable and that cannot be expressed by structured data, such as audio, video, and image data. The semi-structured data is data between structured data and unstructured data. Semi-structured data is data of the same type and has different attributes, for example, data of an email system.

Because a large amount of data included in big data is associated with each other, a data analysis method, model, or tool is used to analyze big data, mine data relationships in big data, and perform prediction or decision-making based on the data relationships in big data. For example, shopping trend data of users is analyzed, and items that may be purchased by the users are pushed to the users, thereby improving user shopping experience. Therefore, big data features a large amount of data, a fast data growth rate, a variety of data types, and high utilization value.

Because a data amount of big data is very large, a single computing node cannot meet a computing requirement of big data. Generally, a distributed file system (DFS) is used to store and manage big data, and a plurality of computing nodes in a computing cluster are used to process big data services.

Figure 1:
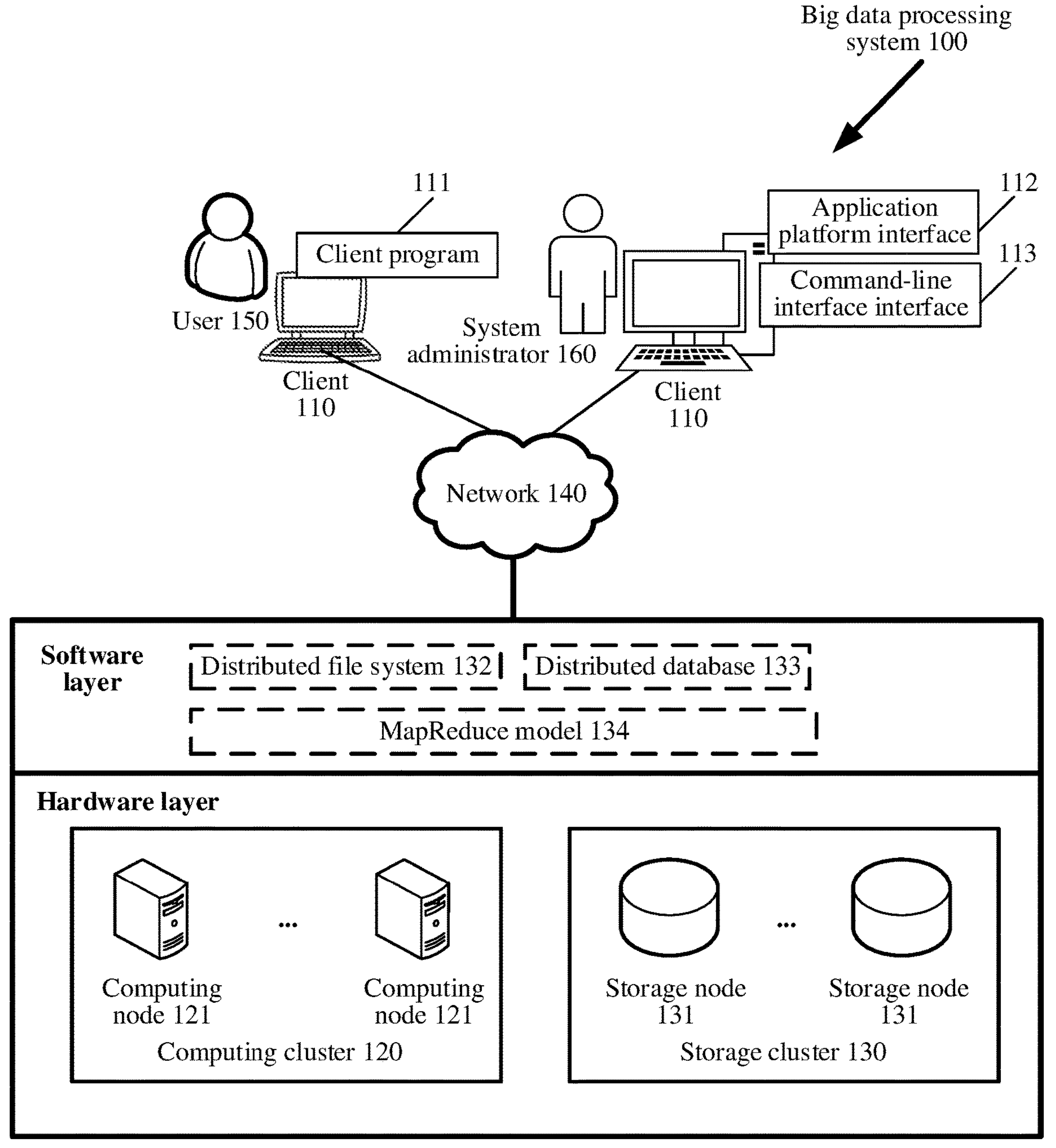
FIG. 1 is a schematic diagram of an architecture of a big data processing system according to an embodiment of this application.

FIG. 1 is a schematic diagram of an architecture of a big data processing system according to an embodiment of this application. As shown in FIG. 1, a big data processing system 100 includes a client 110, a computing cluster 120, and a storage cluster 130.

The storage cluster 130 includes at least two storage nodes 131. One storage node 131 includes one or more controllers, a network adapter, and a plurality of hard disks. The hard disk is configured to store data. The hard disk may be a magnetic disk or another type of storage medium, for example, a solid-state disk or a shingled magnetic recording hard disk. The network adapter is configured to communicate with the computing node 121 included in the computing cluster 120. The controller is configured to write data into the hard disk or read data from the hard disk based on a data read/write request sent by the computing node 121. In a data read/write process, the controller needs to convert an address carried in the data read/write request into an address that can be identified by the hard disk.

The client 110 communicates with the computing cluster 120 and the storage cluster 130 through the network 140. For example, the client 110 sends a service request for a big data service to the computing cluster 120 through the network 140, to request the computing cluster 120 to perform distributed processing on service data included in the service request. The network 140 may be an internal network of an enterprise (for example, a local area network (LAN)) or the Internet.

In some embodiments, the storage cluster 130 stores and manages big data based on a distributed file system 132 and a distributed database 133. A client program 111 is installed on the client 110. The client 110 runs the client program 111 to display a user interface (UI). The user 150 operates the user interface to access the distributed file system 132 and the distributed database 133 to obtain data, and indicates the computing cluster 120 to process a big data service. The client 110 refers to a computer connected to a network 140, which may also be referred to as a workstation. Different clients can share resources in the network (such as computing resources and storage resources). In some other embodiments, the system administrator 160 may access the distributed file system 132 and the distributed database 133 by invoking an application platform interface (API) 112 or a command-line interface (CLI) interface 113 through the client 110, to configure system information and the like, for example, deployment information and a storage policy of storage media in a plurality of deployment modes that are configured for a computing node or a storage node according to this embodiment of this application.

Figure 2:
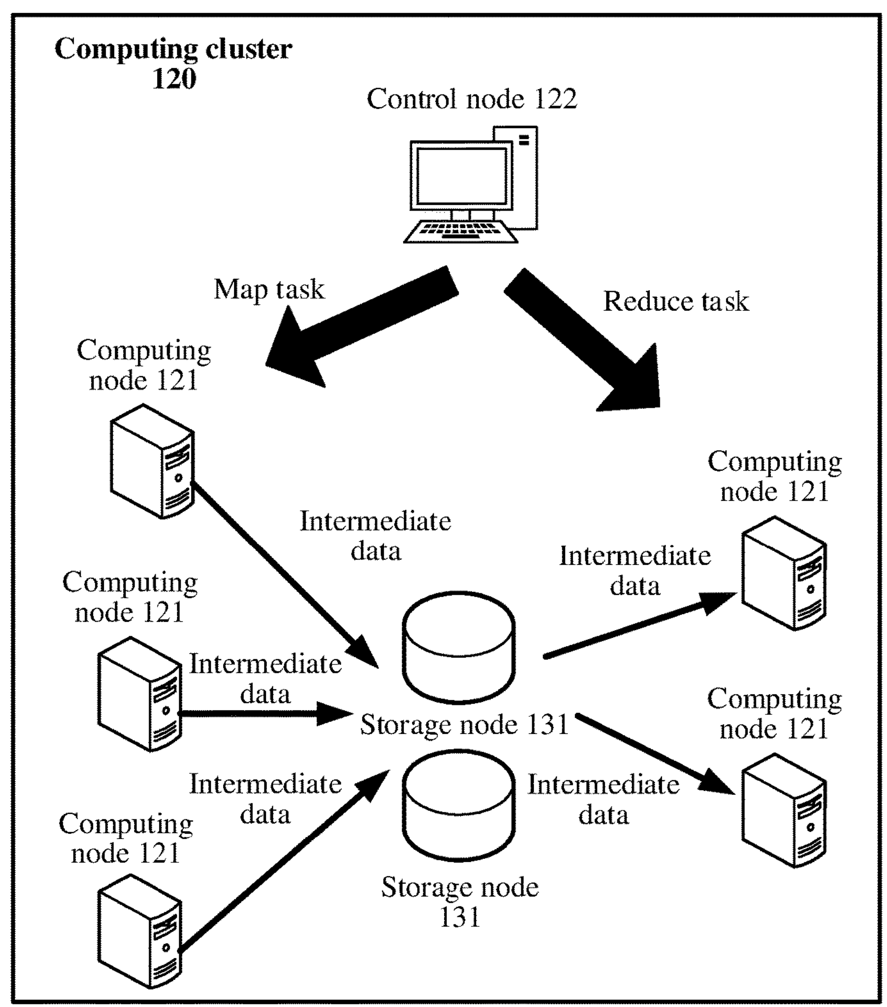
FIG. 2 is a schematic diagram of big data distributed processing according to an embodiment of this application.

The computing cluster 120 includes at least two computing nodes 121, and the computing nodes 121 may communicate with each other. The computing node 121 is a computing device, such as a server, a desktop computer, or a controller of a storage array. The big data service submitted by the client 110 may be referred to as a job. A job can be divided into a plurality of tasks. A plurality of computing nodes execute the plurality of tasks concurrently. When all the tasks are complete, the job is complete. A task is a process of processing some data or phases in a job. All tasks are obtained through scheduling in parallel or serial mode. In some embodiments, the computing cluster 120 performs distributed processing on the big data service based on a MapReduce model 134. The MapReduce model is a distributed programming model, that is, a big data service is decomposed into a map task and a reduce task, and the plurality of computing nodes 121 execute the map task, collect a processing result, and execute the reduce task. In some embodiments, as shown in FIG. 2, the computing cluster 120 includes a control node 122 and at least two computing nodes 121. The control node and the computing node may be independent physical devices, and the control node may also be referred to as a control device or a naming node. The computing node may be referred to as a computing device or a data node. The control node 122 is configured to manage a namespace of the distributed file system and access of the client 110 to the distributed file system. In addition, the control node 122 indicates a computing node that executes the map task and a computing node that executes the reduce task. The computing node stores the intermediate data based on the intermediate data (or referred to as map data or shuffle data) obtained by executing the map task based on the MapReduce model 134. The computing node that executes the reduce task reads the intermediate data. Optionally, when storing data, the storage cluster 130 may also process the data based on the MapReduce model 134 and then store the data.

An embodiment of this application provides a data processing method, and in particular, provides a big-data-oriented distributed processing technology. Specifically, a technology of selecting a storage medium for storing intermediate data from storage media in a plurality of deployment modes is provided, to reduce occupied storage space of a storage medium (for example, a memory or a disk) in a computing device for storing intermediate data, and release more available storage space for a computing node to execute a map task or a reduce task.

Figure 3:
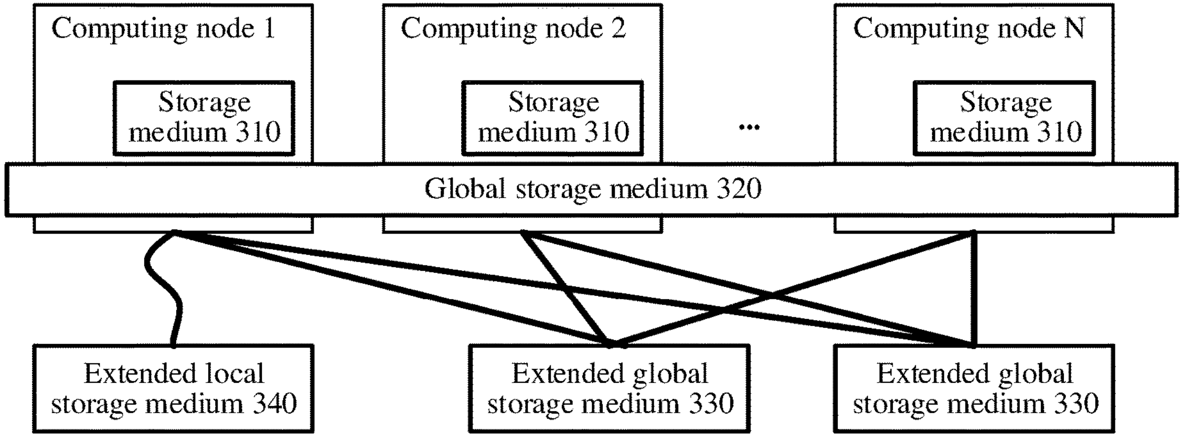
FIG. 3 is a schematic diagram of a deployment scenario of storage media according to an embodiment of this application.

A plurality of deployment modes include a local deployment mode, a converged deployment mode, and a separated deployment mode. In the local deployment mode, the storage medium refers to a local storage medium. The storage medium in the converged deployment mode refers to a global storage medium based on the local storage medium. In the separated deployment mode, storage media include an extended global storage medium and an extended local storage medium. The storage media in the plurality of deployment modes include at least two of a local storage medium in the computing device, a global storage medium formed based on the local storage medium, an extended global storage medium, and an extended local storage medium. For example, FIG. 3 is a schematic diagram of a deployment scenario of storage media according to an embodiment of this application. A storage medium 310 in each of N computing nodes may be a storage medium in the local deployment mode. A global storage medium 320 includes storage media provided by at least two of the N computing nodes. The global storage medium is a storage medium that can be accessed by all computing nodes in the system and has global unified addressing. It should be understood that a storage capacity of the global storage medium is a part of storage capacities in storage media of the N computing nodes, and storage capacities reserved in the storage media of the N computing nodes are used by the computing nodes to process a big data service.

An extended global storage medium 330 refers to a newly added storage medium connected to the N computing nodes in the system. The newly added storage medium has global unified addressing, and all the N computing nodes can access the extended global storage medium 330. An extended local storage medium 340 refers to a newly added storage medium connected to a computing node in the system, and the newly added storage medium is accessed only by the computing node connected to the newly added storage medium.

It should be noted that a memory is a storage device configured to store a program and various data. A larger capacity of the memory indicates a lower access speed. On the contrary, a smaller capacity of the memory indicates a higher access speed. The access speed refers to a data transmission speed when data is written to or read from the memory. The access speed may also be referred to as a read/write speed. The memory may be divided into different levels based on a storage capacity and an access speed.

Figure 4:
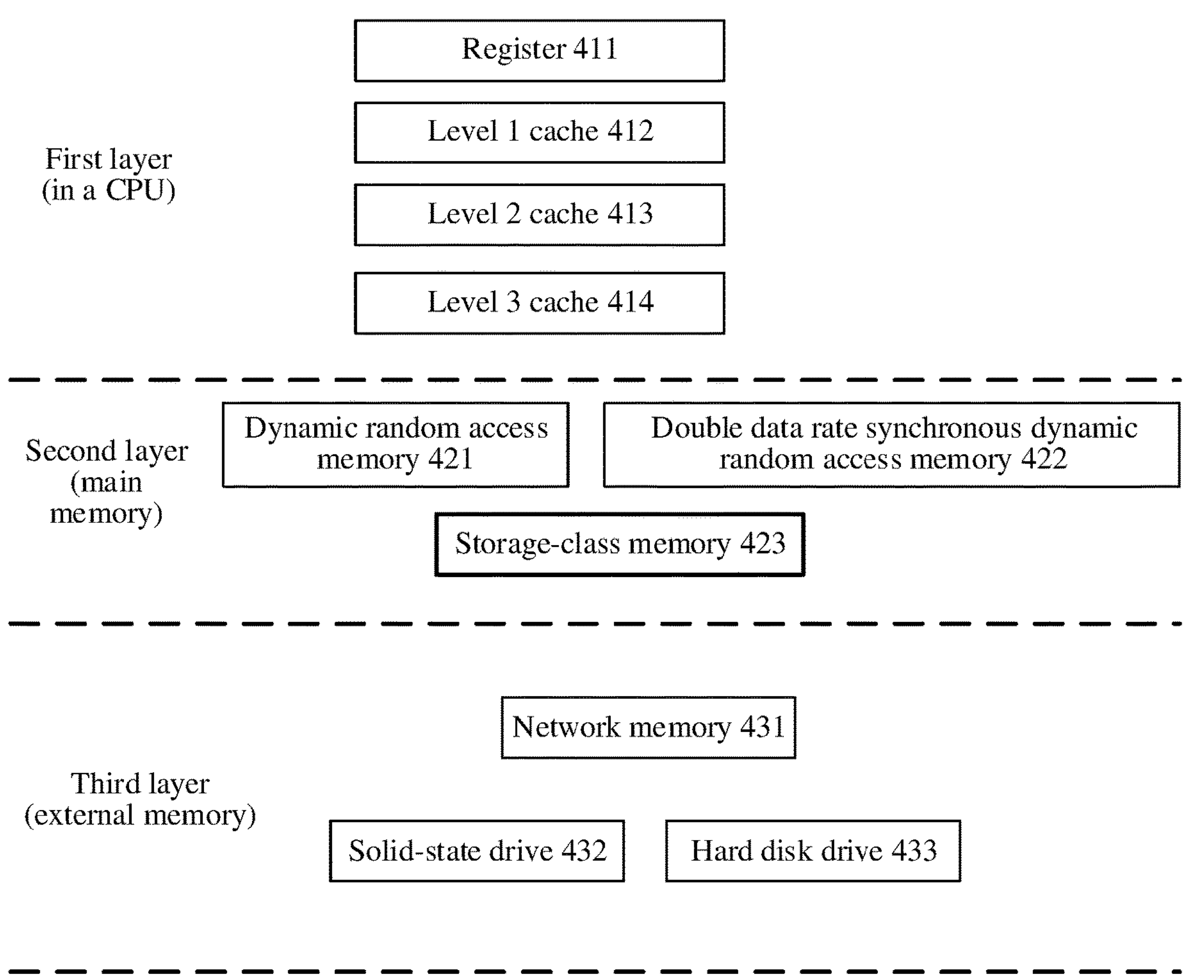
FIG. 4 is a schematic diagram of a storage system with a three-layer structure according to an embodiment of this application.

For example, FIG. 4 is a schematic diagram of a storage system with a three-layer structure according to an embodiment of this application. From a first layer to a third layer, a storage capacity increases level by level, an access speed decreases level by level, and a cost decreases level by level. As shown in FIG. 4, the first layer includes a register 411, a level 1 cache 412, a level 2 cache 413, and a level 3 cache 414 that are located in a central processing unit (CPU). A memory included in the second layer may be used as a main memory of a computer system, for example, a dynamic random access memory (DRAM) 421, a double data rate synchronous dynamic random access memory (SDRAM, DDR SDRAM) 422, and a storage-class memory (SCM) 423. The main memory may be referred to as a main memory or a memory for short, that is, a memory that exchanges information with the CPU. The memory included in the third layer may be used as a secondary memory of the computer system, for example, a network memory 431, a solid-state drive (Solid-State Disk or Solid-State Drive, SSD) 432, and a hard disk drive (HDD) 433. The secondary memory may be referred to as a secondary memory or an external memory for short. Compared with the main storage, the external storage has a larger storage capacity and a lower access speed. It can be seen that a memory closer to the CPU has a smaller capacity, a faster access speed, a larger bandwidth, and lower delay. Therefore, the memory included in the third layer stores data that is not frequently accessed by the CPU, thereby improving data reliability. The memory included in the second layer may be used as a cache device, and is configured to store data frequently accessed by the CPU, thereby significantly improving access performance of the system.

The storage media in the plurality of deployment modes in this embodiment of this application includes a memory, a hard disk, a memory server, and an SCM. For example, as shown in Table 1, this embodiment of this application provides storage media in a plurality of deployment modes.

TABLE 1

| Deployment mode | Storage medium | Write delay | Read delay | Storage capacity | Access speed | CPU consumption | Energy consumption ratio | Reliability |
|---|---|---|---|---|---|---|---|---|
| Local storage | (1) Hard disk | 1 ms | 1 ms | 10000 G | Low | Large | Large | Persistent and |

TABLE 1-continued

| Deployment mode | Storage medium | Write delay | Read delay | Storage capacity | Access speed | CPU consumption | Energy consumption ratio | Reliability |
|---|---|---|---|---|---|---|---|---|
| medium | | | | | | | | reliable |
| | (2) Internal memory | 10 µs | 20 µs | 100 G | Relatively high | Relatively high | Relatively large | Reliable |
| Global storage medium | (3) DRAM | 500 ns | 10 µs | 1000 G | High | Low | Low | Volatile |
| | (4) SCM | 1 µs | 15 µs | 10000 G | Relatively high | Low | Low | Persistent and reliable |
| Extended global storage medium | (5) Memory server | 10 µs | 10 µs | 1000 G | Relatively high | Relatively low | Low | Volatile |
| | (6) High-performance storage | 20 µs | 20 µs | 10000 G | Relatively low | Relatively high | Relatively high | Persistent and reliable |
| Extended local storage medium | (7) Memory server | 10 µs | 10 µs | 1000 G | Relatively high | Relatively low | Relatively low | Volatile |
| | (8) High-performance storage | 20 µs | 20 µs | 10000 G | Relatively low | Relatively high | Relatively high | Persistent and reliable |

It can be learned from Table 1 that the local storage medium includes a memory and a hard disk, an access speed of the memory is higher than an access speed of the hard disk, and a storage capacity of the memory is lower than a storage capacity of the hard disk. The global storage medium formed based on the local storage medium includes a DRAM and an SCM, and an access speed of the DRAM is higher than an access speed of the SCM. Both the extended global storage medium and the extended local storage medium include memory servers and high-performance storage (HPS). Different storage media have different storage medium features. A storage medium feature includes at least one of a write delay, a read delay, a total storage capacity, an access speed, CPU consumption, an energy consumption ratio, and reliability. The write delay is a delay of writing the intermediate data into the storage medium by the computing node 121. The read delay is a delay of reading the intermediate data from the storage medium by the computing node 121. A storage capacity is the total storage capacity of the storage medium for storing data. The access speed is a speed at which the computing node 121 performs a read/write operation on the storage medium. The CPU consumption is CPU usage of the computing node 121 for the computing node 121 to write the intermediate data to the storage medium or read the intermediate data from the storage medium. The energy consumption ratio is energy (such as electric energy) consumed in a unit time. The reliability is durability of data storing of the storage medium. The storage media in the plurality of deployment modes in Table 1 are merely examples for description. In actual application, the storage media in the plurality of deployment modes may be configured based on a service requirement.

With reference to the accompanying drawings, the following describes in detail an implementation of selecting a storage medium for storing intermediate data from storage media in a plurality of deployment modes according to an embodiment of this application.

Figure 5A:
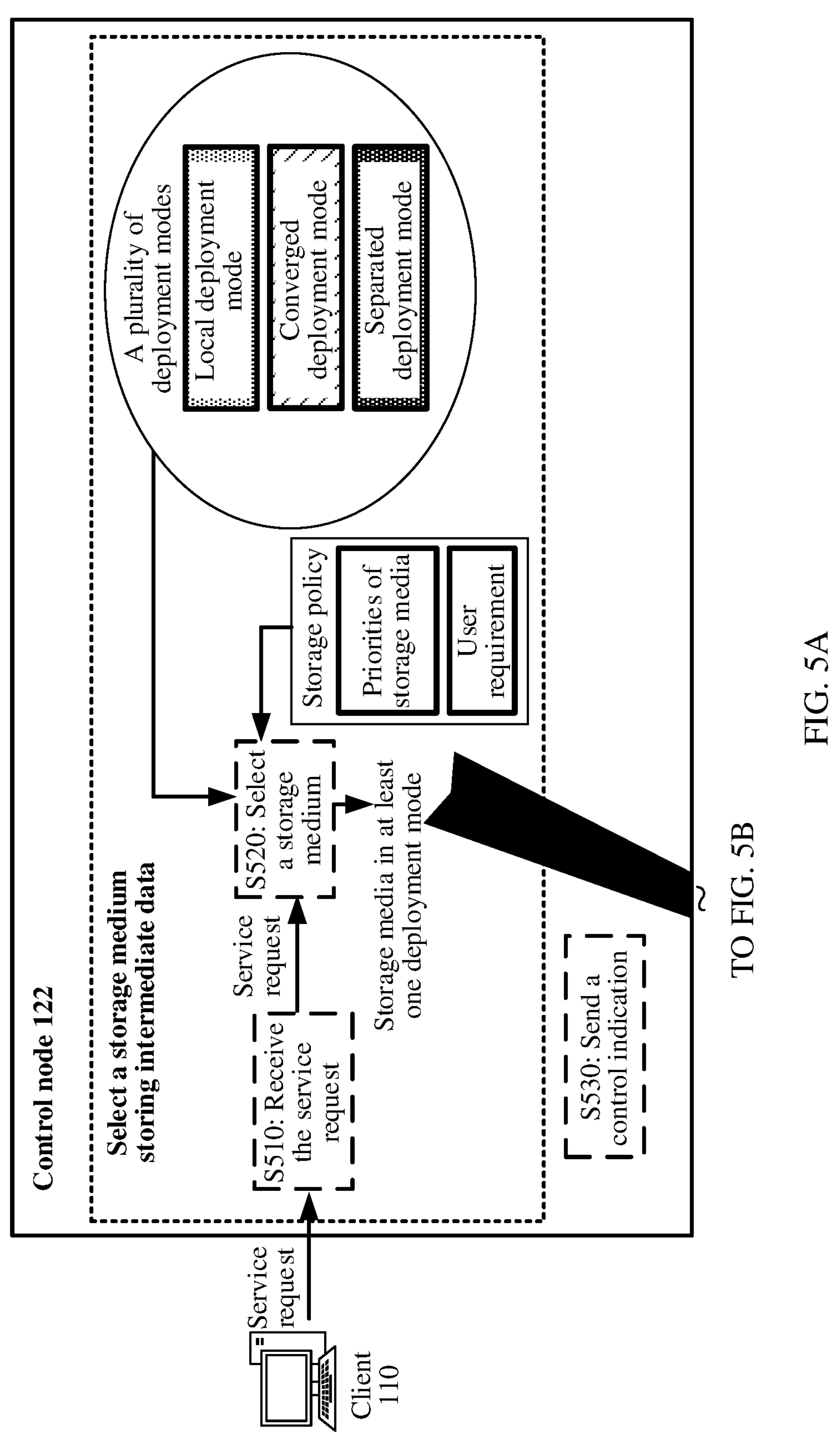
FIG. 5A and FIG. 5B are a schematic diagram of a process of writing intermediate data according to an embodiment of this application.
Figure 5B:
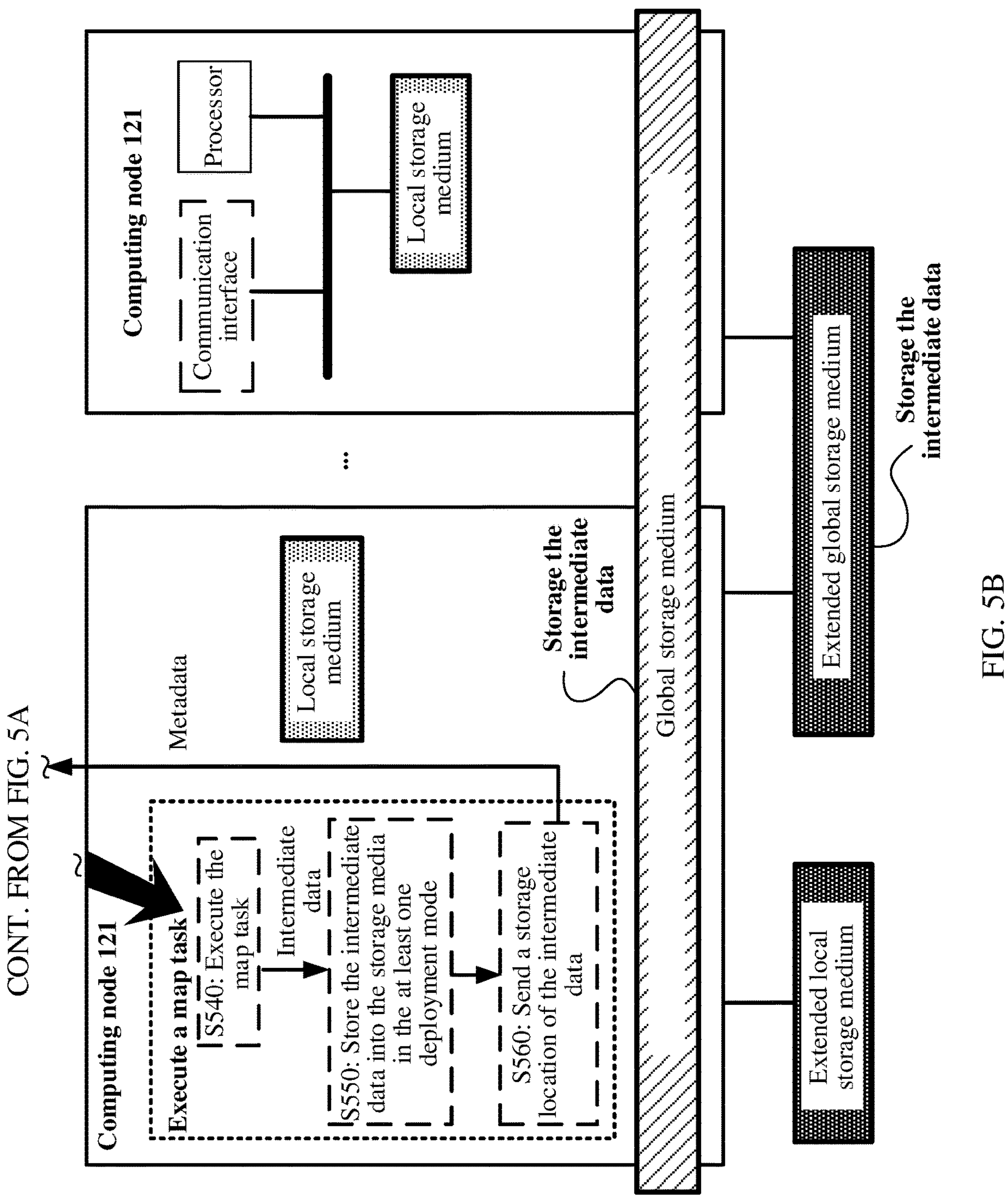

FIG. 5A and FIG. 5B are a schematic flowchart of a data processing method according to an embodiment of this application. A client 110 and a computing cluster 120 are used as an example for description. The computing cluster 120 includes a control node 122 and at least two computing nodes 121. The control node 122 is configured to control the computing node 121 to perform big data distributed processing. The computing node 121 is equipped with storage media in a plurality of deployment modes. As shown in FIG. 5A and FIG. 5B, the method includes the following steps.

S510: The control node 122 receives a service request for a big data service sent by the client 110.

The client 110 sends the service request for the big data service to the control node 122 in response to a user operation. The user operation may be an operation performed by a user on a big data user interface to submit the big data service. The control node 122 may receive, through a local area network or the Internet, the service request for the big data service sent by the client 110. The service request may include a service identifier and service data. The service identifier only indicates one big data service. The service data may be data for the computing node to perform the big data distributed processing or indicate identification data of to-be-processed data.

The big data service includes a data analysis service, a data query service, a data modification service, and the like. For example, the big data service analyzes personal data and purchase behavior data of customers to describe user profiles and classify the customers. In this way, targeted products or offered products can be recommended to specific customers, improving customer satisfaction and enhancing customer relationships. For another example, the big data service analyzes a historical sales volume of a product to predict a future sales volume, finds the reason for sales volume decrease or increase, and recommends constructive suggestions for improving the sales volume.

S520: The control node 122 determines storage media in at least one deployment mode from storage media in a plurality of deployment modes.

The control node 122 determines the storage media in the at least one deployment mode from the storage media in the plurality of deployment modes based on a storage policy. For example, the storage media in the at least one deployment mode includes a global storage medium and an extended global storage medium. The storage policy indicates a method for selecting a storage medium based on a storage medium feature.

In some embodiments, the control node 122 is equipped with priorities of storage media in a plurality of deployment modes determined based on the storage medium feature.

For example, the priorities of the storage media in the plurality of deployment modes are determined based on access speeds of the storage media. An access speed of the global storage medium is higher than an access speed of a memory, an access speed of the memory is higher than an access speed of a hard disk, an access speed of the hard disk is higher than an access speed of an extended local storage medium, and an access speed of the extended local storage medium is higher than an access speed of the extended global storage medium. A priority of the storage medium (3) in the eight storage media shown in Table 1 is the highest, and the priorities of the storage media are sequentially a priority of the DRAM, a priority of the SCM, a priority of the memory, a priority of the hard disk, a priority of the memory server, and a priority of the high-performance storage in descending order.

For another example, the priorities of the storage media in the plurality of deployment modes are determined based on priorities of the deployment modes. A priority of a local deployment mode is higher than a priority of a converged deployment mode, and a priority of a converged deployment mode is higher than a priority of a separated deployment mode. For example, a priority of the storage medium (1) in the eight storage media shown in Table 1 is the highest, and the priorities are sequentially reduced to the storage medium (8). That is, the priorities of the storage media are sequentially a priority of the memory, a priority of the hard disk, a priority of the DRAM, a priority of the SCM, a priority of the memory server, and a priority of the high-performance storage in descending order. Optionally, a priority of the converged deployment mode is higher than a priority of the local deployment mode. A priority of the local deployment mode is higher than a priority of the separated deployment mode. A priority of the storage medium (3) in the eight storage media shown in Table 1 is the highest, and the priorities of the storage media are sequentially a priority of the DRAM, a priority of the SCM, a priority of the memory, a priority of the hard disk, a priority of the memory server, and a priority of the high-performance storage in descending order.

For another example, the priorities of the storage media in the plurality of deployment modes may be comprehensively determined based on features of the plurality of storage media. The priorities of the storage media in the plurality of deployment modes are determined based on the priorities of the deployment modes. A priority of storage media of a same deployment mode may be determined based on access speeds of the storage media. A priority of the storage medium (1) in the eight storage media shown in Table 1 is the highest, and priorities are sequentially reduced to the storage medium (8).

The control node 122 determines the storage media in the at least one deployment mode from the storage media in the plurality of deployment modes based on the priorities of the storage media in the plurality of deployment modes indicated by the storage policy. For example, the storage medium feature may further include an available storage capacity. The available storage capacity is a remaining storage capacity obtained by subtracting a used storage capacity from a storage capacity of a storage medium. The control node 122 determines, starting from a storage medium with a highest priority, whether an available storage capacity of the storage medium with the highest priority is greater than a threshold based on the priorities of the storage media in the plurality of deployment modes. If the available storage capacity of the storage medium with the highest priority is greater than the threshold, it indicates that the storage medium with the highest priority has redundant storage space to store intermediate data, and selects the storage medium with the highest priority to store the intermediate data. If the available storage capacity of the storage medium with the highest priority is less than or equal to the threshold, it indicates that the storage medium with the highest priority has no redundant storage space for storing the intermediate data, and it is determined whether an available storage capacity of a storage medium with a second highest priority is greater than the threshold. The storage media in the plurality of deployment modes are sequentially traversed, and finally, storage media in at least one deployment mode is determined from the storage media in the plurality of deployment modes. When the control node 122 selects the storage medium based on the priorities of the deployment modes, the storage media in the at least one deployment mode may include a plurality of storage media in one deployment mode.

In some other embodiments, the control node 122 determines, from the storage media in the plurality of deployment modes based on a user requirement and the storage medium features of the storage media in the plurality of deployment modes, the storage media in the at least one deployment mode that meets the user requirement, where the user requirement indicates a requirement related to the storage medium features.

For example, the control node 122 is equipped with storage medium features of the storage media in the plurality of deployment modes. The service request includes the user requirement, and the user requirement indicates an access speed range or a specific access speed. The control node 122 determines, from the storage media in the plurality of deployment modes, the storage media in the at least one deployment mode that meets the user requirement. For example, the user requirement indicates a memory access speed. The control node 122 determines the local storage medium or the global storage medium formed based on the local storage medium from the storage media in the plurality of deployment modes, for example, at least one of a memory, a DRAM, or an SCM.

For another example, the control node 122 is equipped with an association relationship between a storage medium and a customer level. The service request includes the user requirement, and the user requirement indicates a first customer level. The control node 122 determines a storage medium associated with the first customer level from the association relationship based on the first customer level, and determines the storage medium associated with the first customer level for storing the intermediate data.

In this way, when selecting, from the storage media in the plurality of deployment modes, the storage medium for storing the intermediate data, the control node 122 dynamically selects, based on the user requirement of the user for a feature such as an access speed or reliability, the storage medium of the at least one deployment mode that meets the user requirement. Compared with using a storage medium in one deployment mode to store the intermediate data in different scenarios, a scenario requirement of data processing performance and reliability is ensured.

Optionally, the control node 122 may further select, from the storage media in the at least one deployment mode that meets the user requirement, a storage medium whose available storage capacity is greater than the threshold for storing the intermediate data.

It should be noted that, in actual application, the storage policy may be set based on a service requirement, a scenario requirement, a user requirement, or the like. The foregoing description of the storage policy is merely an example for description. For example, the storage policy may alternatively refer to a data localization preference, that is, preferentially storing the intermediate data to a local storage medium. For another example, the storage policy may alternatively refer to selecting performance first, storage capacity first, cost first, or the like based on a trade-off between performance and costs of an application.

Before the control node 122 selects the storage medium for storing the intermediate data by using the storage policy, that is, before S520 is performed, the storage policy and configuration information of the storage media in the plurality of deployment modes may be preconfigured. The storage policy provided in this embodiment of this application is configured at a big data service granularity, or configured at a task granularity in a big data service, or configured at a system global granularity. In this case, the control node 122 may use the storage policy when selecting, in processing a big data service, processing a task in a big data service, or processing a system global task, a storage medium for storing the intermediate data.

In addition, the control node 122 may select an idle computing node 121 in the computing cluster 120 to execute the map task, or select, based on a balancing policy, the computing node 121 from the computing cluster 120 to execute the map task.

S530: The control node 122 sends a control indication to at least one computing node 121.

The control node 122 may divide a big data service into a plurality of map tasks, determine a computing node 121 that executes each map task, and determine a storage medium used by the computing node 121 that executes each map task to store the intermediate data according to the method described in S520.

The control node 122 sends a control indication to the at least one computing node 121 that executes the map task, and the control indication indicates the computing node 121 to execute the map task in the big data distributed processing on the service data, and store obtained intermediate data in the storage media in the at least one deployment mode. The control indication may include the service data and identifiers of the storage media in the at least one deployment mode.

S540: The computing node 121 executes the map task in the big data distributed processing on the service data based on the control indication sent by the control node 122, to obtain the intermediate data.

S550: The computing node 121 stores the intermediate data in storage media indicated by the identifiers of the storage media in the at least one deployment mode.

For an explanation of the storage media in the at least one deployment mode, refer to the description in S520. Details are not described herein again. The computing node 121 may write the intermediate data into the storage media in the at least one deployment mode through a gathering (gather) interface.

Optionally, different access interfaces may be configured for the storage media in the plurality of deployment modes, and the computing node 121 may invoke a corresponding access interface of a storage medium to write the intermediate data to the storage medium. For example, the computing node 121 invokes an access interface of the global storage medium to write the intermediate data to the global storage medium. For another example, the computing node 121 invokes an access interface of the extended global storage medium to write the intermediate data to the extended global storage medium.

If the storage media in the at least one deployment mode includes a plurality of storage media in one deployment mode, a plurality of shards of the intermediate data are respectively stored in the plurality of storage media. For example, the plurality of storage media of the one deployment mode include storage media 310 in the N computing nodes shown in FIG. 3. Alternatively, if the storage media in the at least one deployment mode includes storage media in more than two deployment modes, a plurality of shards of the intermediate data are respectively stored in the storage media in the more than two deployment modes. For example, the storage media in the more than two deployment modes include a global storage medium 320 and an extended global storage medium 330 shown in FIG. 3.

S560: The computing node 121 sends a storage location of the intermediate data in the storage media in the at least one deployment mode to the control node 122.

Figure 6:
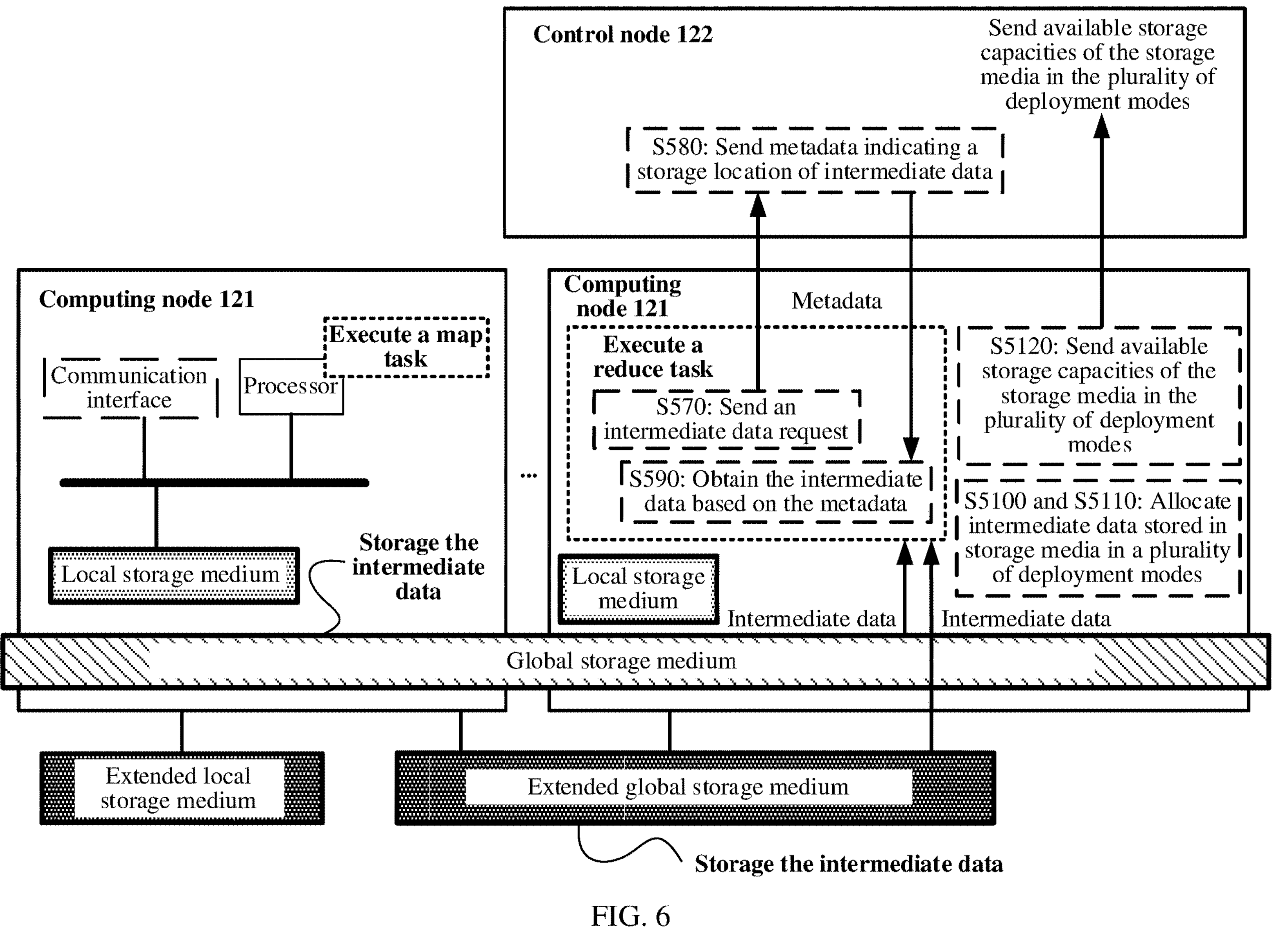
FIG. 6 is a schematic diagram of a process of reading intermediate data according to an embodiment of this application.

The computing node 121 stores the intermediate data in the storage medium indicated by the identifiers of the storage media in the at least one deployment mode, to generate metadata, and the metadata indicates the storage location of the intermediate data. The computing node 121 sends the metadata to the control node 122, so that the control node 122 indicates, to read the intermediate data, the computing node 121 executing the reduce task. For example, as shown in FIG. 6, the computing node 121 performs S570 and the control node 122 performs S580.

S570: The computing node 121 sends an intermediate data request to the control node 122.

The intermediate data request is used at the storage location in which the intermediate data is located. For example, the intermediate data request includes a service identifier or an object identifier, and the object identifier indicates an identifier of data that needs to be obtained.

S580. The control node 122 sends the metadata indicating the storage location of the intermediate data to the computing node 121.

S590: The computing node 121 obtains the intermediate data based on the metadata.

The computing node 121 obtains the intermediate data based on the storage location of the intermediate data through the gathering interface, and executes the reduce task based on the intermediate data. If the intermediate data is stored in a plurality of storage media, the computing node 121 obtains the shards of the intermediate data from the plurality of storage media.

It should be noted that the computing node that executes the map task and the computing node that executes the reduce task may be different computing nodes.

According to the data processing method provided in this embodiment of this application, a single deployment mode of a storage medium for storing intermediate data is extended to a plurality of deployment modes, so that a storage location for storing the intermediate data is extended. In addition, a proper storage policy is flexibly configured and selected based on a service scenario requirement, to achieve a balance between performance, cost-effectiveness, reliability, and energy consumption.

The computing node 121 is further configured to monitor resource usage (for example, an available storage capacity) of an accessible storage medium, record distribution of the intermediate data in the storage medium, and schedule the intermediate data stored in the storage media in the plurality of deployment modes. For example, if an available storage capacity of the first storage medium is less than or equal to the threshold, S5100 is performed, that is, the computing node 121 stores the data of the first storage medium into the second storage medium. An access speed of the first storage medium is higher than an access speed of the second storage medium.

If the available storage capacity of the first storage medium is greater than the threshold, S5110 is performed, that is, the computing node 121 stores removed data from the second storage medium into the first storage medium. An access speed of the first storage medium is higher than an access speed of the second storage medium. For example, if an available storage capacity of the first storage medium is less than or equal to 90% of the storage capacity, S5100 is performed; and if the available storage capacity of the first storage medium is greater than 70% of the storage capacity, S5110 is performed.

It should be noted that the computing node 121 may asynchronously perform S520, S5100, and S5110, that is, the computing node 121 may use different processor cores to perform S520, S5100, and S5110. Therefore, before the computing node 121 performs S520, after the intermediate data in the storage medium whose available storage capacity is less than the threshold is removed, an available storage capacity of the storage medium can be increased, so as to improve processing efficiency of the intermediate data, and ensure that the intermediate data can be normally written into the storage medium.

In some embodiments, the computing node 121 may further remove the intermediate data based on a priority of the intermediate data. For example, the priority of the intermediate data may be determined based on a partition identifier of a partition to which the intermediate data belongs. The priority of the intermediate data is determined based on an ascending order of partition identifiers. In this case, intermediate data corresponding to a smaller partition identifier is more likely to be removed to a storage medium with a relatively low access speed, and intermediate data corresponding to a smaller partition identifier is more likely to be removed to a storage medium with a relatively high access speed.

Therefore, when executing a reduce task, the computing node 121 can read the intermediate data from a relatively fast storage medium with a higher probability, thereby maximizing a performance advantage of completing shuffle on the relatively fast storage medium.

A storage medium that accepts removed data is not limited in this embodiment of this application. For example, the intermediate data is moved from the local storage medium to the global storage medium formed based on the local storage medium, the extended global storage medium, or the extended local storage medium. For another example, the intermediate data is moved from the memory to the hard disk. For another example, the intermediate data is moved from the DRAM to the hard disk.

The computing node 121 may further perform S5120, that is, the computing node 121 sends the available storage capacities of the storage media in the plurality of deployment modes to the control node 122, so that the control node 122 determines the storage media in the at least one deployment mode from the storage media in the plurality of deployment modes based on the available storage capacities of the storage media.

It may be understood that, to implement the functions in the foregoing embodiments, the computing device includes a corresponding hardware structure and/or software module for performing each function. A person skilled in the art should be easily aware that, in combination with the examples described in embodiments disclosed in this application, units and method steps may be implemented by hardware or a combination of hardware and computer software in this application. Whether a function is performed by hardware or hardware driven by computer software depends on particular application scenarios and design constraints of the technical solutions.

The foregoing describes in detail the data processing method provided in this embodiment with reference to FIG. 1 to FIG. 6. The following describes a control apparatus and a data processing apparatus provided in this embodiment with reference to FIG. 7 and FIG. 8.

Figure 7:
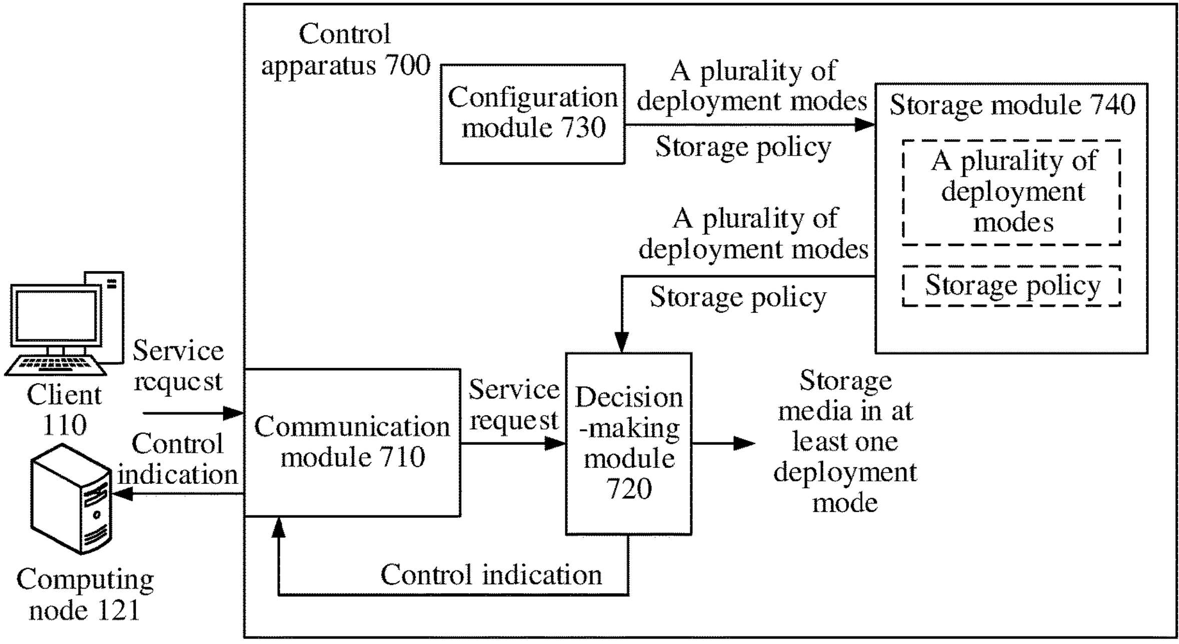
FIG. 7 is a schematic diagram of a structure of a control apparatus according to an embodiment of this application.

FIG. 7 is a schematic diagram of a structure of a possible control apparatus according to this embodiment. These control apparatuses can be configured to implement functions of the control device or the control node in the foregoing method embodiment, and therefore can also implement beneficial effects of the foregoing method embodiment. In this embodiment, the control apparatus may be the control node 122 shown in FIG. 5A, or may be a module (for example, a chip) used for a server.

As shown in FIG. 7, the control apparatus 700 includes a communication module 710, a decision-making module 720, a configuration module 730, and a storage module 740. The control apparatus 700 is configured to implement functions of the control node 122 in the method embodiment shown in FIG. 5A.

The communication module 710 is configured to obtain a service request for a big data service, where the service request includes service data; and send a control indication to a computing device, where the control indication indicates the computing device to execute a map task in big data distributed processing on the service data, and store obtained intermediate data in storage media in at least one deployment mode. For example, the communication module 710 is configured to perform S510 and S530 in FIG. 5A.

The decision-making module 720 is configured to determine the storage media in the at least one deployment mode from storage media in a plurality of deployment modes, and the storage media in the plurality of deployment modes includes at least two of a local storage medium in a computing device, a global storage medium formed based on the local storage medium, an extended global storage medium, and an extended local storage medium. For example, the decision-making module 720 is configured to perform S520 in FIG. 5A.

The configuration module 730 is configured to configure the storage media and storage policies of a plurality of deployment modes. The storage module 740 is configured to store the plurality of deployment modes and the storage policies, so that the decision-making module 720 determines the storage media in the at least one deployment mode from the storage media in the plurality of deployment modes based on the storage policies. The storage module 740 is further configured to store metadata, and the metadata indicates a storage location of intermediate data. The communication module 710 is further configured to send the metadata to the computing device, so that the control device indicates, to read the intermediate data, the computing device executing a reduce task. For example, the communication module 710 is configured to perform S580 in FIG. 5A and FIG. 5B.

Optionally, the decision-making module 720 is specifically configured to determine the storage media in the at least one deployment mode from the storage media in the plurality of deployment modes based on priorities of the storage media in the plurality of deployment modes that are indicated by the storage policy, and the priorities of the storage media in the plurality of deployment modes are determined based on a storage medium feature.

Optionally, the decision-making module 720 is specifically configured to determine, from the storage media in the plurality of deployment modes based on a user requirement and the storage medium feature of the storage media in the plurality of deployment modes, the storage media in at least one deployment mode that meets the user requirement, and the user requirement indicates a requirement related to the storage medium feature.

Figure 8:
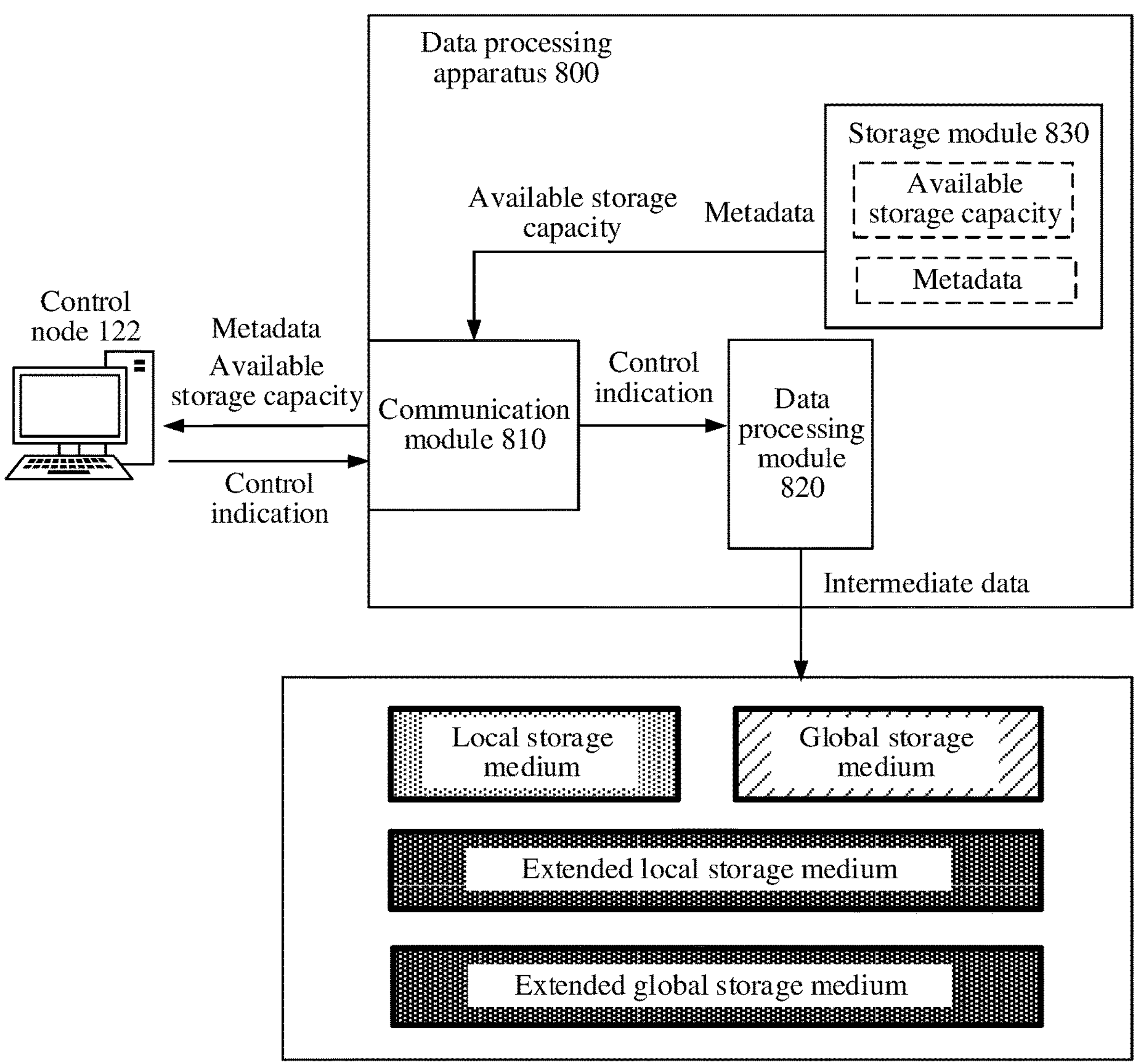
FIG. 8 is a schematic diagram of a structure of a data processing apparatus according to an embodiment of this application.

FIG. 8 is a schematic diagram of a structure of a possible data processing apparatus according to this embodiment. These data processing apparatuses can be configured to implement functions of the computing device or the computing node in the foregoing method embodiment, and therefore can also implement beneficial effects of the foregoing method embodiment. In this embodiment, the data processing apparatus may be the computing node 121 shown in FIG. 5B, or may be a module (for example, a chip) used for a server.

As shown in FIG. 8, the data processing apparatus 800 includes a communication module 810, a data processing module 820, and a storage module 830. The data processing apparatus 800 is configured to implement functions of the computing node 121 in the method embodiment shown in FIG. 5B.

The communication module 810 is configured to receive a control indication sent by a control device. The control indication includes service data and identifiers of storage media in at least one deployment mode, the storage media in the at least one deployment mode are determined by the control device from storage media in a plurality of deployment modes based on a storage policy, and the storage policy indicates a method for selecting a storage medium based on a storage medium feature.

The data processing module 820 is configured to execute a map task in big data distributed processing on the service data based on the control indication, to obtain intermediate data, and store the intermediate data in storage media indicated by the identifiers of the storage media in the at least one deployment mode. For example, the data processing module 820 is configured to perform S540 and S550 in FIG. 5B.

The storage module 830 is configured to store available storage capacities of the storage media in the plurality of deployment modes, so as to send the available storage capacities of the storage media in the plurality of deployment modes to the control device. For example, the communication module 810 is configured to perform S560 in FIG. 5B.

The storage module 830 is configured to store metadata, where the metadata indicates a storage location of the intermediate data, to send the metadata to the control device, so that the computing device that executes a reduce task obtains the metadata from the control device and reads the intermediate data.

The data processing module 820 is specifically configured to, if the storage media in the at least one deployment mode includes a plurality of storage media in one deployment mode, respectively store a plurality of shards of the intermediate data in the plurality of storage media; or if the storage media in the at least one deployment mode includes storage media in more than two deployment modes, respectively store a plurality of shards of the intermediate data in the storage media in more than two deployment modes.

The data processing module 820 is further configured to store, if an available storage capacity of a first storage medium is less than a threshold, data of the first storage medium into a second storage medium, and an access speed of the first storage medium is higher than an access speed of the second storage medium.

Optionally, the communication module 810 is further configured to send an intermediate data request. For example, the communication module 810 is configured to perform S570 in FIG. 6.

Optionally, the data processing module 820 is further configured to obtain the intermediate data based on the metadata. For example, the data processing module 820 is configured to perform S590 in FIG. 6.

Optionally, the data processing module 820 is further configured to monitor resource usage (for example, an available storage capacity) of an accessible storage medium, record distribution of the intermediate data in storage media, and schedule the intermediate data stored in the storage media in the plurality of deployment modes. For example, the data processing module 820 is configured to perform S5100 and S5110 in FIG. 6.

Optionally, the communication module 810 is further configured to send the available storage capacities of the storage media in the plurality of deployment modes. For example, the communication module 810 is configured to perform S5120 in FIG. 6.

It should be understood that the control apparatus 700 or the data processing apparatus 800 in this embodiment of this application may be implemented by using an application-specific integrated circuit (ASIC) or a programmable logic device (PLD). The PLD may be a complex program logic device (CPLD), a field programmable gate array (FPGA), a generic array logic (GAL), or any combination thereof. Alternatively, when the data processing method shown in FIG. 5A and FIG. 5B or FIG. 6 may be implemented by using software, the control apparatus 700 and the modules thereof may also be software modules, and the data processing apparatus 800 and the modules thereof may also be software modules.

The control apparatus 700 or the data processing apparatus 800 according to this embodiment of this application may correspondingly perform the methods described in embodiments of this application, and the foregoing and other operations and/or functions of the units in the control apparatus 700 or the data processing apparatus 800 are respectively used to implement corresponding procedures of the methods in FIG. 5A and FIG. 5B or FIG. 6. For brevity, details are not described herein again.

Figure 9:
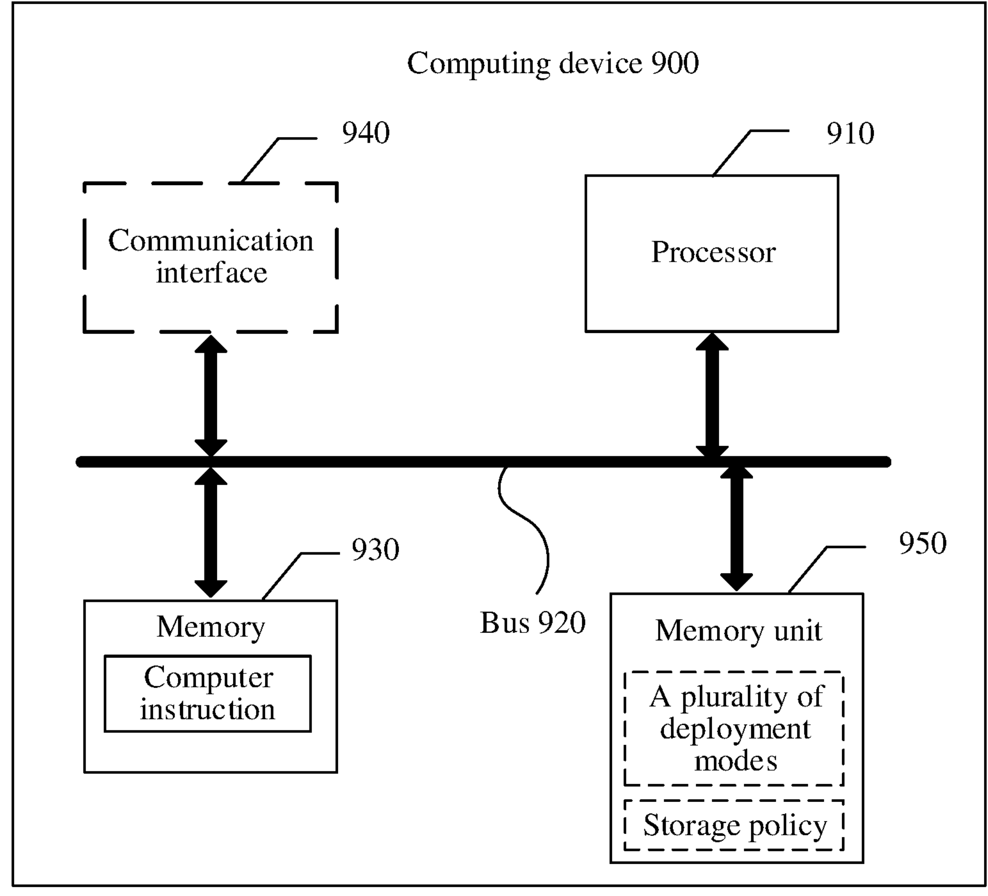
FIG. 9 is a schematic diagram of a structure of a computing device according to an embodiment of this application.

FIG. 9 is a schematic diagram of a structure of a computing device 900 according to this embodiment. As shown in the figure, the computing device 900 includes a processor 910, a bus 920, a memory 930, a communication interface 940, and a memory unit 950 (which may also be referred to as a main memory unit). The processor 910, the memory 930, the memory unit 950, and the communication interface 940 are connected through the bus 920.

It should be understood that, in this embodiment, the processor 910 may be a CPU, or the processor 910 may be another general purpose processor, a digital signal processor (DSP), an ASIC, an FPGA or another programmable logic device, a discrete gate or a transistor logic device, a discrete hardware component, or the like. The general-purpose processor may be a microprocessor, any conventional processor, or the like.

Alternatively, the processor may be a graphics processing unit (GPU), a neural network processing unit (NPU), a microprocessor, an ASIC, or one or more integrated circuits configured to control program execution in the solutions of this application.

The communication interface 940 is configured to implement communication between the computing device 900 and an external device or component. In this embodiment, when the computing device 900 is configured to implement functions of the control node 122 shown in FIG. 5A, the communication interface 940 is configured to send a control indication, to indicate that the computing node 121 executes a map task in big data distributed processing on service data, and store obtained intermediate data in storage media in at least one deployment mode. When the computing device 900 is configured to implement functions of the computing node 121 shown in FIG. 5B or FIG. 6, the communication interface 940 is configured to receive a control indication, and send, to the control node 122, available storage capacities of storage media in a plurality of deployment modes.

The bus 920 may include a path, configured to transfer information between the foregoing components (for example, the processor 910, the memory unit 950, and the memory 930). In addition to a data bus, the bus 920 may further include a power bus, a control bus, a state signal bus, and the like. However, for the purpose of clear descriptions, various buses are all marked as the bus 920 in the figure. The bus 920 may be a peripheral component interconnect express (PCIe) bus, an extended industry standard architecture (EISA) bus, a unified bus (Ubus, or UB), a compute express link (CXL) bus, a cache coherent interconnect for accelerators (CCIX) bus, or the like. The bus 920 may be classified into an address bus, a data bus, a control bus, and the like.

In an example, the computing device 900 may include a plurality of processors. The processor may be a multi-core (multi-CPU) processor. The processor herein may be one or more devices, circuits, and/or computing units configured to process data (for example, computer program instructions). In this embodiment, when the computing device 900 is configured to implement functions of the control node 122 shown in FIG. 5A, the processor 910 may invoke a storage policy stored in the memory 930, and determine the storage media in the at least one deployment mode from the storage media in the plurality of deployment modes based on the storage policy. When the computing device 900 is configured to implement functions of the computing node 121 shown in FIG. 5B, the processor 910 may execute a map task in the big data distributed processing on the service data based on the control indication sent by the control node 122, to obtain intermediate data, and store the intermediate data in storage media indicated by the identifiers of the storage media in the at least one deployment mode.

It should be noted that, in FIG. 9, only an example in which the computing device 900 includes one processor 910 and one memory 930 is used. Herein, the processor 910 and the memory 930 are separately configured to indicate a type of component or device. In a specific embodiment, a quantity of components or devices of each type may be determined based on a service requirement.

The memory unit 950 may correspond to the storage medium configured to store information such as the plurality of deployment modes and the storage policies in the foregoing method embodiments. The memory unit 950 may be a volatile memory or a non-volatile memory, or may include both a volatile memory and a non-volatile memory. The nonvolatile memory may be a read-only memory (ROM), a programmable read-only memory (ROM, PROM), an erasable programmable read-only memory (PROM, EPROM), an electrically erasable programmable read-only memory (EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

The memory 930 may correspond to the storage medium, for example, a magnetic disk, such as a mechanical hard disk or a solid-state disk, configured to store information such as computer instructions and storage policies in the foregoing method embodiments.

The computing device 900 may be a general-purpose device or a dedicated device. For example, the computing device 900 may be an edge device (for example, a box carrying a chip with a processing capability), or the like. Optionally, the computing device 900 may alternatively be a server or another device with a computing capability.

It should be understood that the computing device 900 according to this embodiment may correspond to the control apparatus 700 or the data processing apparatus 800 in this embodiment, and may correspond to a corresponding body in any method according to FIG. 5A and FIG. 5B or FIG. 6. In addition, the foregoing and other operations and/or functions of the modules in the control apparatus 700 or the data processing apparatus 800 are respectively used to implement corresponding procedures of the methods in FIG. 5A and FIG. 5B or FIG. 6. For brevity, details are not described herein again.

The method steps in this embodiment may be implemented by hardware, or may be implemented by a processor by executing software instructions. The software instructions may include a corresponding software module. The software module may be stored in a random access memory (RAM), a flash memory, a read-only memory (ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a computing device. Certainly, the processor and the storage medium may alternatively exist in a computing device as discrete components.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, a user equipment, or another programmable apparatus. The computer programs or instructions may be stored in a computer-readable storage medium, or may be transmitted from one computer-readable storage medium to another computer-readable storage medium. For example, the computer programs or instructions may be transmitted from one website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a digital video disc (DVD); or may be a semiconductor medium, for example, a solid-state disk (SSD). The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method, performed by a control device which is configured to control a computing device to perform big data distributed processing, wherein the computing device is equipped with storage media in a plurality of deployment modes, comprising:

obtaining a service request for a big data service, wherein the service request comprises service data;

determining at least one deployment mode from the plurality of deployment modes for the storage media, wherein the plurality of deployment modes include a local deployment mode, a converged deployment mode, and a separated deployment mode, wherein the storage media in the plurality of deployment modes comprise at least two of a local storage medium in the computing device, a global storage medium formed based on the local storage medium, an extended global storage medium, or an extended local storage medium, wherein the global storage medium is accessible to all computing devices controlled by the control device, and wherein in the local deployment mode the storage media include the local storage medium, in the converged deployment mode the storage media include the global storage medium, and in the separated deployment mode the storage media include the extended global storage medium and the extended local storage medium; and sending a control indication to the computing device, wherein the control indication indicates the computing device to execute a map task in the big data distributed processing on the service data, and indicates the computing device to store obtained intermediate data in the storage media in the at least one deployment mode.

2. The method according to claim 1, wherein the determining the storage media in the at least one deployment mode from the storage media in the plurality of deployment modes comprises:

determining the storage media in the at least one deployment mode from the storage media in the plurality of deployment modes based on a storage policy, wherein the storage policy indicates a method for selecting a storage medium based on a storage medium feature, and the storage medium feature comprises at least one of a write delay, a read delay, a total storage capacity, an available storage capacity, an access speed, central processing unit (CPU) consumption, an energy consumption ratio, or reliability.

3. The method according to claim 2, wherein the determining the storage media in the at least one deployment mode from the storage media in the plurality of deployment modes based on the storage policy comprises:

determining the storage media in the at least one deployment mode from the storage media in the plurality of deployment modes based on priorities of the storage media in the plurality of deployment modes indicated by the storage policy, wherein the priorities of the storage media in the plurality of deployment modes are determined based on the storage medium feature.

4. The method according to claim 2, wherein the determining the storage media in the at least one deployment mode from the storage media in the plurality of deployment modes based on the storage policy comprises:

determining, based on a user requirement and storage medium features of the storage media in the plurality of deployment modes, the storage media in the at least one deployment mode that meet the user requirement from the storage media in the plurality of deployment modes, wherein the user requirement indicates a requirement related to the storage medium feature.

5. The method according to claim 1, wherein the storage media comprises a memory, a hard disk, a memory server, and a storage-class memory (SCM).

6. The method according to claim 1, wherein after sending the control indication to the computing device, the method further comprises:

receiving a storage location of the intermediate data in the storage media in the at least one deployment mode sent by the computing device, wherein the storage location of the intermediate data is for reading the intermediate data in response to a reduce task being executed.

7. A control device for controlling a computing device to perform big data distributed processing, wherein the computing device is equipped with storage media in a plurality of deployment modes, and the control device comprises:

a memory, configured to store a set of computer instructions; and at least one processor, configured to execute the set of computer instructions to:

obtain a service request for a big data service, wherein the service request comprises service data;

determine at least one deployment mode from the plurality of deployment modes for the storage media, wherein the plurality of deployment modes include a local deployment mode, a converged deployment mode, and a separated deployment mode, wherein the storage media in the plurality of deployment modes comprise at least two of a local storage medium in the computing device, a global storage medium formed based on the local storage medium, an extended global storage medium, or an extended local storage medium, wherein the global storage medium is accessible to all computing devices controlled by the control device, and wherein in the local deployment mode the storage media include the local storage medium, in the converged deployment mode the storage media include the global storage medium, and in the separated deployment mode the storage media include the extended global storage medium and the extended local storage medium; and send a control indication to the computing device, wherein the control indication indicates the computing device to execute a map task in the big data distributed processing on the service data, and indicates the computing device to store obtained intermediate data in the storage media in the at least one deployment mode.

8. The control device according to claim 7, wherein the at least one processor is further configured to:

determine the storage media in the at least one deployment mode from the storage media in the plurality of deployment modes based on a storage policy, wherein the storage policy indicates a method for selecting a storage medium based on a storage medium feature, and the storage medium feature comprises at least one of a write delay, a read delay, a total storage capacity, an available storage capacity, an access speed, central processing unit (CPU) consumption, an energy consumption ratio, or reliability.

9. The control device according to claim 8, wherein the at least one processor is further configured to:

determine the storage media in the at least one deployment mode from the storage media in the plurality of deployment modes based on priorities of the storage media in the plurality of deployment modes indicated by the storage policy, wherein the priorities of the storage media in the plurality of deployment modes are determined based on the storage medium feature.

10. The control device according to claim 8, wherein the at least one processor is further configured to:

determine, based on a user requirement and storage medium features of the storage media in the plurality of deployment modes, the storage media in the at least one deployment mode that meet the user requirement from the storage media in the plurality of deployment modes, wherein the user requirement indicates a requirement related to the storage medium feature.

11. The control device according to claim 7, wherein the storage media comprises a memory, a hard disk, a memory server, and a storage-class memory (SCM).

12. The control device according to claim 7, wherein after sending the control indication to the computing device, the at least one processor is further configured to:

receive a storage location of the intermediate data in the storage media in the at least one deployment mode sent by the computing device, wherein the storage location of the intermediate data is for reading the intermediate data in response to a reduce task being executed.

13. A system, comprising:

a control device; and a computing device, wherein the control device is configured to:

obtain a service request for a big data service, wherein the service request comprises service data;

determine at least one deployment mode from a plurality of deployment modes for the storage media, wherein the plurality of deployment modes include a local deployment mode, a converged deployment mode, and a separated deployment mode, wherein the storage media in the plurality of deployment modes comprise at least two of a local storage medium in the computing device, a global storage medium formed based on the local storage medium, an extended global storage medium, or an extended local storage medium, wherein the global storage medium is accessible to all computing devices controlled by the control device, and wherein in the local deployment mode the storage media include the local storage medium, in the converged deployment mode the storage media include the global storage medium, and in the separated deployment mode the storage media include the extended global storage medium and the extended local storage medium; and send a control indication to the computing device, wherein the control indication indicates the computing device to execute a map task in the big data distributed processing on the service data, and indicates the computing device to store obtained intermediate data in the storage media in the at least one deployment mode;

and wherein the computing device is configured to:

execute the map task sent by the control device to obtain the intermediate data; and store the intermediate data in the storage media indicated by identifiers of the storage media in the at least one deployment mode.

14. The system according to claim 13, wherein the controller device is further configured to:

determine the storage media in the at least one deployment mode from the storage media in the plurality of deployment modes based on a storage policy, wherein the storage policy indicates a method for selecting a storage medium based on a storage medium feature, and the storage medium feature comprises at least one of a write delay, a read delay, a total storage capacity, an available storage capacity, an access speed, central processing unit (CPU) consumption, an energy consumption ratio, or reliability.

15. The system according to claim 14, wherein the control device is further configured to:

determine the storage media in the at least one deployment mode from the storage media in the plurality of deployment modes based on priorities of the storage media in the plurality of deployment modes indicated by the storage policy, wherein the priorities of the storage media in the plurality of deployment modes are determined based on the storage medium feature.

16. The system according to claim 14, wherein the control device is further configured to: determine, based on a user requirement and storage medium features of the storage media in the plurality of deployment modes, the storage media in the at least one deployment mode that meet the user requirement from the storage media in the plurality of deployment modes, wherein the user requirement indicates a requirement related to the storage medium feature.

17. The system according to claim 13, wherein the storage media comprises a memory, a hard disk, a memory server, and a storage-class memory (SCM).

18. The system according to claim 13, wherein after sending the control indication to the computing device, the control device is further configured to: receive a storage location of the intermediate data in the storage media in the at least one deployment mode sent by the computing device, wherein the storage location of the intermediate data is for reading the intermediate data in response to a reduce task being executed.

19. The system according to claim 13, wherein the computing device is further configured to:

store, based on the storage media in the at least one deployment mode comprising a plurality of storage media in one deployment mode, a plurality of shards of the intermediate data in the plurality of storage media respectively; or store, based on the storage media in the at least one deployment mode comprising storage media in more than two deployment modes, a plurality of shards of the intermediate data in the storage media in the more than two deployment modes respectively.

20. The system according to claim 13, wherein the computing device is further configured to:

store, based on an available storage capacity of a first storage medium being less than a threshold, data of the first storage medium into a second storage medium, wherein an access speed of the first storage medium is higher than an access speed of the second storage medium.

* * * * *